C. E. NELSON.
DRAG.
APPLICATION FILED SEPT. 27, 1919.
1,339,664.
Patented May 11, 1920.
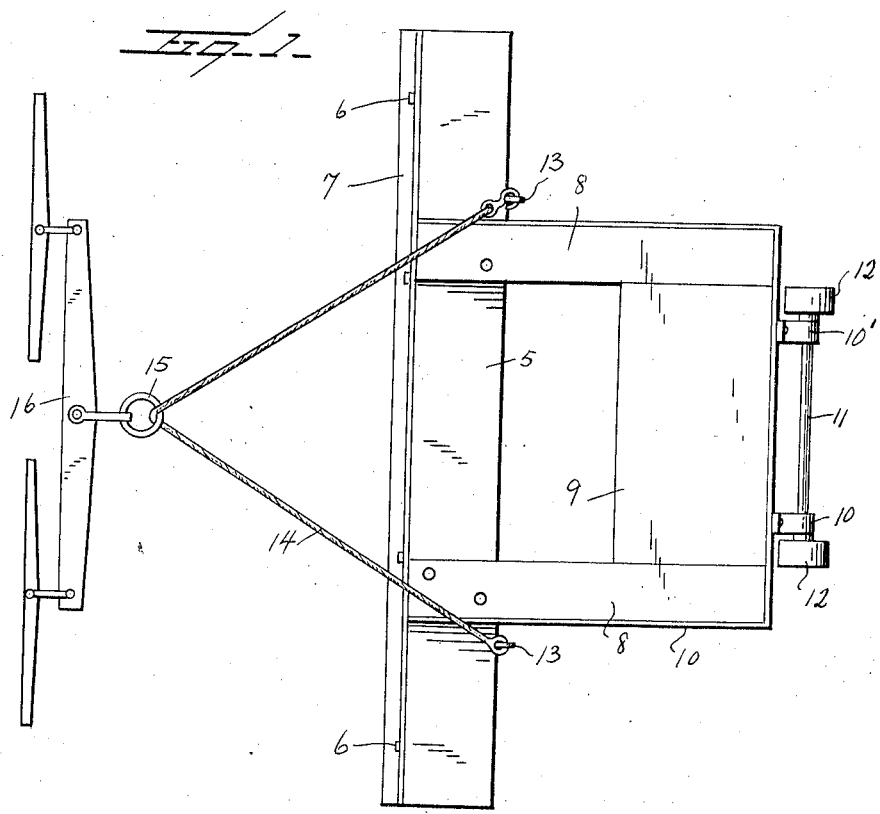
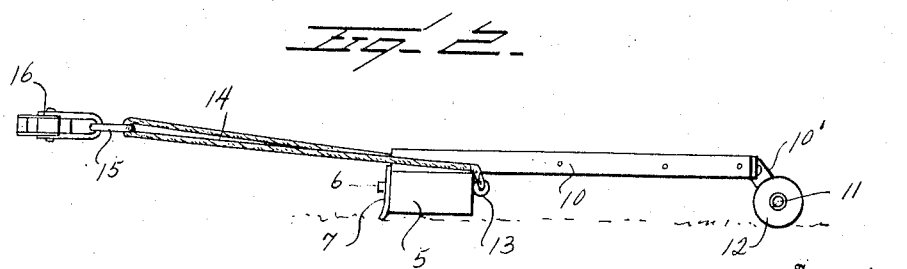
Inventor
C. E. Nelson
By Watson E. Coleman
Attorney

UNITED STATES PATENT OFFICE.

CHARLEY E. NELSON, OF MORGAN, TEXAS.

DRAG.

1,339,664.  Specification of Letters Patent.  Patented May 11, 1920.

Application filed September 27, 1919. Serial No. 326,715.

*To all whom it may concern:*

Be it known that I, CHARLEY E. NELSON, a citizen of the United States, residing at Morgan, in the county of Bosque and State of Texas, have invented certain new and useful Improvements in Drags, of which the following is a specification, reference being had to the accompanying drawings.

This invention relates to drags, and particularly to ground drags for grading and removing refuse from the surface of the soil, and has for its object to provide a device of this character which is simple in construction, easily operated, and one which will last indefinitely.

Another object is to provide a drag which eliminates adjusting mechanisms by providing a platform adapted to carry a driver or a weight and arranged to hold the drag in engagement with the ground through the medium of the weight.

Another object is to provide a drag having draft means connected to its rear portions and extending over the drag and arranged to dump the drag to release the soil and refuse gathered thereby when the weight is removed from the platform.

Another object is to provide a drag having draft means tending to turn the drag, and a platform adapted to support a weight, the weight being shiftable on the platform to regulate the pitch of the scraping edge of the drag.

These objects are attained by the mechanism illustrated in the accompanying drawings, in which:—

Figure 1 is a top plan view of the drag constructed in accordance with my invention;

Fig. 2 is an end elevation.

Referring to the drawings, 5 indicates an elongated drag member having a relatively wide top and bottom and a narrow front and rear portion. Secured to the front portion, as at 6, and projecting partially below the lower edge thereof is a scraping blade 7 which coöperates with the bottom of the drag member in the cleaning and grading operation. Projecting rearwardly from the top of the drag 5 is a pair of supports 8 connected at their rear portions by a foot board 9. A band of strap iron 10' is secured to the sides of the supporting arm and the foot board to efficiently brace the same. The supporting arms 8 and foot board 9 provide a platform adapted to support the driver or a weight. Depending from the rear platform is a plurality of bearings 10 in which a shaft 11 is journaled, while mounted on the shaft is a plurality of wheels 12 adapted to engage the ground to support the free end of the platform. Projecting from the rear portion of the drag member 5 adjacent each end thereof is an eye 13 adapted to receive the cables 14. The remaining ends of the cables 14 are connected to the ring 15, to which draft means 16 are connected.

The tendency of the cables 14, in view of the fact that they are connected to the rear portion of the drag and extend over the top thereof, is to turn the top of the drag toward the ground. This tendency is overcome by the driver or weight positioned on the platform. By the driver shifting his weight forward or backward on the platform, the pitch of the scraping blade 7 can be adjusted to the desired position without the use of any other adjusting mechanism. When the dragging operation has been completed, the driver steps from the platform, or removes the weight therefrom, whereupon the cables 14 turn the top of the drag 5 toward the ground, thereby releasing the scraping blade from the material gathered and permitting the same to be dumped at the desired place. The wheels 12 carried by the rear of the platform prevent frictional engagement of the rear portion of the platform with the ground and eliminate damage to the platform should the same encounter obstructions.

From the foregoing, it will be readily seen that this drag provides an excellent device for cleaning lots and like places, and as its construction is simple, it can be manufactured and maintained at a small cost. It will be also noted that each one of the elements of this invention performs more than one function. The draft means and cables not only serve their purpose as means for drawing the drag over the ground, but also act as a dumping means for the drag. The platform not only supports the driver or a weight, if desired, but regulates the pitch of the drag, and the wheels not only support the platform and relieve the burden of the drafting means by eliminating friction with the ground, but prevent damage to the platform.

I claim:

1. In a device of the character described comprising a ground engaging drag member, draft means connected to said drag member for drawing and dumping said drag member, and a platform projecting rearwardly from the top of said drag member and adapted, when weight is applied thereto, to hold the bottom of said drag closely adjacent the ground.

2. In a device of the character described comprising a ground engaging drag member, scraping means carried by said drag member, draft means connected to the rear of said drag member and extending over the top of said member, a platform extending rearwardly from the drag member, ground engaging wheels carried by the free end of the platform, said platform being arranged, when weight is applied thereto, to hold the drag member and scraping means in engagement with the ground to regulate the pitch of the drag member by resisting the tendency of the draft means to swing the top of the drag into engagement with the ground.

3. In a device of the character described comprising an elongated drag member having a relatively wide top and bottom surface, ground engaging scraping means carried by the front edge of the drag member, a platform extending rearwardly from the top of said drag member, and draft means connected to the rear edge of said drag member adjacent its ends and the front portion of the platform.

4. In a device of the character described comprising an elongated drag member having a relatively wide top and bottom surface, scraping means carried by the front edge of the drag member, a platform extending rearwardly from the intermediate top portion of said drag, and draft means connected to the rear edge of said drag member adjacent its ends and the front portion of the platform, said platform being arranged to balance the draft of the draft means according to the application of weight thereto.

5. In a device of the character described comprising an elongated drag member having a relatively wide top and bottom surface, scraping means carried by the front edge of the drag member, a platform extending rearwardly from the intermediate top portion of said drag, and draft means connected to the rear edge of said drag to force the front edge thereof into engagement with the ground.

In testimony whereof I hereunto affix my signature.

CHARLEY E. NELSON.